US012672079B2

(12) United States Patent
Dong

(10) Patent No.: US 12,672,079 B2
(45) Date of Patent: Jun. 30, 2026

(54) COMMUNICATION METHOD AND COMMUNICATION APPARATUS UNDER MULTIPLE LINKS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 341 days.

(21) Appl. No.: 18/288,800

(22) PCT Filed: Apr. 28, 2021

(86) PCT No.: PCT/CN2021/090644
§ 371 (c)(1),
(2) Date: Oct. 27, 2023

(87) PCT Pub. No.: WO2022/226841
PCT Pub. Date: Nov. 3, 2022

(65) Prior Publication Data
US 2024/0224203 A1      Jul. 4, 2024

(51) Int. Cl.
H04W 56/00          (2009.01)
H04W 72/0446       (2023.01)

(52) U.S. Cl.
CPC ..... H04W 56/001 (2013.01); H04W 72/0446 (2013.01)

(58) Field of Classification Search
CPC ........................ H04W 56/001; H04W 72/0446
USPC ........................................................ 370/311
See application file for complete search history.

(56) References Cited

U.S. PATENT DOCUMENTS

| | | | | |
|---|---|---|---|---|
| 11,218,962 B2 * | 1/2022 | Jia | ........................ | H04W 72/23 |
| 11,224,046 B2 * | 1/2022 | Atefi | ..................... | H04W 72/54 |
| 11,564,183 B2 * | 1/2023 | Hakola | ................. | H04W 72/12 |
| 11,570,664 B2 * | 1/2023 | Keskitalo | ......... | H04W 36/0011 |
| 11,659,448 B2 * | 5/2023 | Huang | .................. | H04W 24/02 |
| | | | | 370/328 |
| 11,716,756 B2 * | 8/2023 | Gan | .................. | H04W 72/0446 |
| | | | | 370/329 |

(Continued)

FOREIGN PATENT DOCUMENTS

| | | | | | |
|---|---|---|---|---|---|
| CN | 112218355 A | * | 1/2021 | ........ | H04W 52/0209 |
| CN | 112218363 A | | 1/2021 | | |

(Continued)

OTHER PUBLICATIONS

International Search Report of PCT/CN2021/090644 dated Jan. 26, 2022 with English translation, (4p).

*Primary Examiner* — Melvin H Pollack
(74) *Attorney, Agent, or Firm* — Arch & Lake LLP; Hao Tan; Shen Wang

(57)          ABSTRACT

The present disclosure provides a communication method and a communication apparatus under multiple links. The communication method may include: determining a first message frame, the first message frame comprising an information identification bit, wherein the information identification bit identifies that a first link in multiple links is used for communication between a station in a power-saving state and an access point supporting multi-link communication; and sending the first message frame.

18 Claims, 2 Drawing Sheets

AP MLD                                    non-AP STA MLD

S310 The transmission period and/or the time slot

S320 LI and/or maximum idle period

S330 The first message frame          Determining the first link

Recommending other link

S340 The second message frame

(56) References Cited

U.S. PATENT DOCUMENTS

| | | | | |
|---|---|---|---|---|
| 11,743,834 B2 * | 8/2023 | Min | | H04W 28/0273 |
| | | | | 370/311 |
| 11,758,489 B2 * | 9/2023 | Xu | | H04W 76/40 |
| | | | | 370/311 |
| 11,805,470 B2 * | 10/2023 | Kwon | | H04W 40/248 |
| 11,894,891 B2 * | 2/2024 | Bolotin | | H04B 7/0452 |
| 11,936,473 B2 * | 3/2024 | Homchaudhuri | | H04B 7/024 |
| 11,963,100 B2 * | 4/2024 | Seok | | H04W 52/0222 |
| 12,133,271 B2 * | 10/2024 | Sun | | H04W 72/0446 |
| 12,170,962 B2 * | 12/2024 | Bang | | H04W 52/0248 |
| 12,232,160 B2 * | 2/2025 | Bravo | | H04W 72/569 |
| 12,273,198 B2 * | 4/2025 | Tong | | H04L 5/0048 |
| 12,273,945 B2 * | 4/2025 | Kim | | H04W 36/00692 |
| 12,336,032 B2 * | 6/2025 | Kim | | H04W 76/15 |
| 12,369,122 B2 * | 7/2025 | Kim | | H04W 52/02 |
| 12,389,273 B2 * | 8/2025 | Yeh | | H04W 28/084 |
| 12,425,963 B2 * | 9/2025 | Kim | | H04W 76/15 |
| 12,452,915 B2 * | 10/2025 | Tsai | | H04W 74/0808 |

| | | | | |
|---|---|---|---|---|
| 2020/0120603 A1 | 4/2020 | Seok et al. | | |
| 2021/0014784 A1 | 1/2021 | Kneckt et al. | | |
| 2021/0058868 A1 * | 2/2021 | Cariou | | H04W 52/0206 |
| 2021/0112615 A1 * | 4/2021 | Huang | | H04L 1/1621 |
| 2021/0251006 A1 * | 8/2021 | Cariou | | H04W 74/0816 |
| 2022/0210829 A1 * | 6/2022 | Kim | | H04W 4/40 |
| 2022/0287121 A1 * | 9/2022 | Hwang | | H04W 76/15 |
| 2022/0338066 A1 * | 10/2022 | Chitrakar | | H04W 72/542 |
| 2023/0217492 A1 * | 7/2023 | Garcia Rodriguez | | |
| | | | | H04W 74/0816 |
| | | | | 370/329 |
| 2024/0098809 A1 * | 3/2024 | Wódczak | | H04W 48/20 |
| 2025/0089113 A1 * | 3/2025 | Shafin | | H04W 84/12 |

FOREIGN PATENT DOCUMENTS

| | | | | | |
|---|---|---|---|---|---|
| EP | | 4057530 A1 * | 9/2022 | | H04W 72/23 |
| WO | | 2021003700 A1 | 1/2021 | | |
| WO | | 2021011427 A1 | 1/2021 | | |
| WO | | WO-2021230659 A1 * | 11/2021 | | H04M 1/72448 |

* cited by examiner

AP MLD                                      non-AP STA MLD

AP1 ←——— Link 1 ———→ STA1

AP2 ←——— Link 2 ———→ STA2

AP3 ←——— Link 3 ———→ STA3

Determining a first message frame          210

Transmitting the first message frame       220

COMMUNICATION METHOD AND COMMUNICATION APPARATUS UNDER MULTIPLE LINKS

CROSS-REFERENCE OF RELATED APPLICATION

The present application is a U.S. national phase of International Application No. PCT/CN2021/090644, filed on Apr. 28, 2021, the contents of all of which are incorporated by reference herein in their entireties for all purposes.

TECHNICAL FIELD

This disclosure relates to the field of wireless communication, and more specifically, to a communication method and a communication apparatus under multiple links.

BACKGROUND

The current research scope of Wi-Fi technology is: 320 MHz bandwidth transmission, aggregation and collaboration of multiple frequency bands, etc. It is expected to improve the rate and throughput by at least four times compared to existing standards. Its main application scenarios are video transmission, AR (Augmented Reality), VR (Virtual Reality), etc.

The aggregation and collaboration of multiple frequency bands refer to the simultaneous communication between devices in frequency bands such as 2.4 GHz, 5 GHZ, and 6 GHz. For communication between devices in multiple frequency bands at the same time, a new MAC (Media Access Control) mechanism needs to be defined for management. In addition, it is expected that the aggregation and collaboration of multiple frequency bands can support low latency transmission.

At present, the maximum bandwidth supported in multi-band aggregation and system technology is 320 MHz (160 MHz+160 MHz), and 240 MHz (160 MHz+80 MHz) and other bandwidths may also be supported.

In the related art, station (STA) and access point (AP) can be multi-link device (MLD), which supports the function of simultaneously transmitting and/or receiving under multiple links at the same time. Therefore, in the related art, there can be multiple links between STA and AP, and research is underway on the communication between these two devices under multiple links.

SUMMARY

The various embodiments of the present disclosure provide the following technical solutions.

According to an embodiment of the present disclosure, there is provided a communication method under multiple links. The communication method can be applied to a station supporting multi-link communication, and the communication includes: determining a first message frame, where the first message frame includes an information identification bit, and the information identification bit identifies that a first link among the multiple links is used for communication between a station in a power-saving state and an access point supporting multi-link communication; and transmitting the first message frame.

According to an embodiment of the present disclosure, there is provided a communication method under multiple links. The communication method can be applied to an access point supporting multi-link communication, and the communication method includes: receiving a first message frame, where the first message frame includes an information identification bit, and the information identification bit identifies that a first link among the multiple links is used for communication between a station in a power-saving state and an access point supporting multi-link communication; performing a communication operation based on the first message frame.

According to an embodiment of the present disclosure, there is provided a communication device under multiple links. The communication device can be applied to a station supporting multi-link communication, and the communication device includes: a processing module configured to determine a first message frame, where the first message frame includes an information identification bit, and the information identification bit identifies that a first link among the multiple links is used for communication between a station in a power-saving state and an access point supporting multi-link communication; and a transceiver module configured to transmit the first message frame.

According to an embodiment of the present disclosure, there is provided a communication device under multiple links. The communication device can be applied to an access point supporting multi-link communication, and the com-munication device includes: a transceiver module config-ured to receive a first message frame, where the first message frame includes an information identification bit, and the information identification bit identifies that a first link among the multiple links is used for communication between a station in a power-saving state and an access point supporting multi-link communication; and a processing module configured to control a communication operation based on the first message frame.

According to an embodiment of the present disclosure, there is provided an electronic device. The electronic device includes a memory, a processor, and a computer program stored on the memory and executable on the processor. The processor implements the method described above when executing the computer program.

According to an embodiment of the present disclosure, there is provided a non-transitory computer-readable storage medium. A computer program is stored on the computer-readable storage medium. The computer program, when executed by a processor, implements the method described above.

BRIEF DESCRIPTION OF THE DRAWINGS

By referring to the accompanying drawings and describ-ing in detail the embodiments of the present disclosure, the above and other features of the embodiments of the present disclosure will be more apparent, where.

DETAILED DESCRIPTION

The following description with reference to the accom-panying drawings is provided to assist in a comprehensive understanding of the various embodiments of the present disclosure limited by the accompanying claims and their equivalents. The various embodiments of the present disclosure include various specific details, but these specific details are only considered exemplary. In addition, for clarity and conciseness, descriptions of well-known technologies, functions, and constructions can be omitted.

The terms and expressions used in this disclosure are not limited to written meanings, but are only used by the inventor to enable a clear and consistent understanding of this disclosure. Therefore, for those skilled in the art, the description of various embodiments of the present disclosure is provided for illustrative purposes only, and not for limiting purposes.

It should be understood that unless the context clearly indicates otherwise, the singular forms "one," "a," "said," and "the" used here can also include the plural forms. It should be further understood that the term "including" used in this disclosure refers to the presence of the described features, integers, steps, operations, elements, and/or components, but does not exclude the presence or addition of one or more other features, integers, steps, operations, elements, components, and/or their groups.

It will be understood that although the terms "first," "second," etc. can be used to describe various elements herein, these elements should not be limited by these terms. These terms are only used to distinguish one element from another. Therefore, without departing from the teachings of the embodiments, the first element discussed below can be referred to as the second element.

It should be understood that when a component is referred to as "connected" or "coupled" to another component, it can be directly connected or coupled to other components, or there can also be intermediate components. In addition, the term "link" or "coupling" used here can include wireless link or wireless coupling. The term "and/or" or the expression "at least one of . . . " used here includes any and all combinations of one or more related listed items.

Unless otherwise defined, all terms used herein (including technical and scientific terms) have the same meaning as those generally understood by those skilled in the art to which this disclosure belongs.

Figure 1:
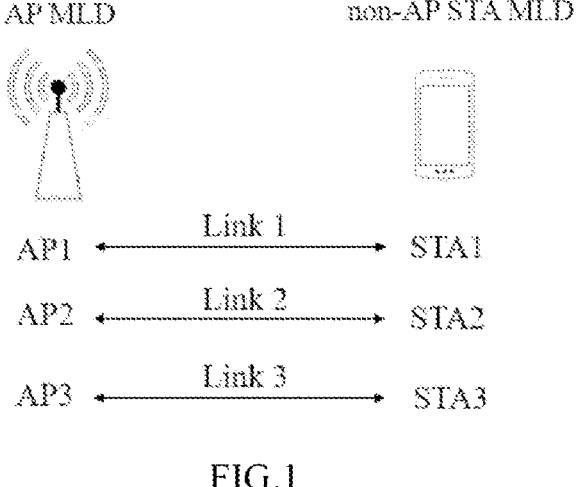
FIG. 1 is an exemplary diagram illustrating a communi-cation scenario under multiple links.

FIG. 1 is an exemplary diagram illustrating a communication scenario under multiple links.

In a wireless local area network, a basic service set (BSS) can be composed of an AP and one or more stations (STAs) that communicate with the AP. A basic service set can be connected to a distribution system DS (Distribution System) through its AP, and then connected to another basic service set, forming an extended service set ESS (Extended Service Set).

AP is a wireless switch for a wireless network and is also the core of a wireless network. AP device can be used as a wireless base station, mainly as a bridge to connect wireless and wired networks. By utilizing such access point AP, wired and wireless networks can be integrated.

AP can include software applications and/or circuits to enable other types of nodes in the wireless network to communicate with both external and internal components of the wireless network through the AP. In some examples, AP can be a terminal device or a network device equipped with Wi-Fi (Wireless Fidelity) chips.

As an example, a station (STA) can include but is not limited to: a cellular phone, a smartphone, a wearable device, a computer, a personal digital assistant (PDA), a personal communication system (PCS) device, a personal information manager (PIM), a personal navigation device (PND), a global positioning system, a multimedia device, an Internet of Things (IOT) device, etc.

In the embodiments of the present disclosure, the AP and STA described in the above embodiments can be devices that support multiple links. For example, they can be represented as AP MLD and non-AP STA MLD, respectively. For the convenience of description, hereinafter, an example of communication between an AP MLD and a non-AP STA MLD under multiple links will be mainly described. However, the embodiments of the present disclosure are not limited to this.

In FIG. 1, as an example only, AP MLD can represent an access point supporting multi-link communication, while non-AP STA MLD can represent a station supporting multi-link communication. Referring to FIG. 1, AP MLD can work under three links, as shown in FIG. 1, including the three affiliated access points AP1, AP2, and AP3. Non-AP STA MLD can also work under three links, as shown in FIG. 1, including the three affiliated stations STA1, STA2, and STA3. In the example of FIG. 1, it is assumed that AP1 and STA1 communicate through the corresponding first link Link 1. Similarly, AP2 and AP3 communicate with STA2 and STA3 through the second link Link 2 and the third link Link 3, respectively. In addition, Link 1 to Link 3 can be multiple links at different frequencies, such as links at 2.4 GHz, 5 GHZ, 6 GHZ, or several links with same or different bandwidths at 2.4 GHz, 5 GHz, 6 GHz. In addition, multiple channels can exist under each link. However, it should be understood that the communication scenario shown in FIG. 1 is only exemplary, and the concept of the present disclosure is not limited to this. For example, an AP MLD can be connected to a plurality of non-AP STA MLDs, or under each link, an AP can communicate with a plurality of STAs (belonging to different non-AP STA MLDs).

During multi-link setup, if the affiliated AP of the AP MLD can include the BSS Max Idle Period element in the Association Response frame or Re-Association Response frame, then the value carried in the Max Idle Period field of the BSS Max Idle Period element can be at MLD level. For example, AP MLD will use this timeout value to make a decision to disassociate. An AP MLD can provide different BSS Max Idle Period values for different non-AP STA MLDs. In this case, at least one STA of non-AP STA MLD can transmit at least one Keep alive frame (such as a data frame, a PS-Poll frame, or a management frame) during the idle period (such as in each BSS Max Idle Period) to avoid non-AP STA MLD being disassociated from AP MLD due to AP MLD not receiving the frame.

In addition, in energy-saving mode, non-AP STA MLD in a power-saving state can periodically wake up. For example, basic operations (such as receiving traffic indication, time synchronization, receiving BSS parameter update, etc.) can be performed by listening for beacon frame from access point on one or more enabled links.

However, in the related art, there is a lack of a method for determining at least one link to listen for beacon frame or transmit Keep alive frame in a power-saving state. In view of this, the embodiments of the present disclosure provide communication method and communication device under multiple links.

Figure 2:
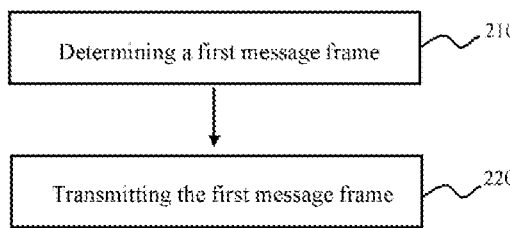
FIG. 2 is a flowchart illustrating a communication method according to an embodiment.

FIG. 2 is a flowchart illustrating a communication method according to an embodiment. The communication method shown in FIG. 2 can be applied to a station supporting multi-link communication (non-AP STA MLD).

Referring to FIG. 2, in step 210, a first message frame can be determined, where the first message frame can include an information identification bit. According to the embodiment, the information identification bit can identify that a first link in the multiple links is used for communication between a station (non-AP STA MLD) in a power saving state and an access point supporting multi-link communication.

According to the embodiment of the present disclosure, the communication method shown in FIG. 2 can be performed during the process of associating non-AP STA MLD with AP MLD or multi-link setup. In this case, the first message frame can be an association request frame, a re-association request frame, or a multi-link setup message frame.

According to the embodiment of the present disclosure, the communication method shown in FIG. 2 can be performed after the completion of association or multi-link setup, in which case the first message frame can be any type of a management frame, a data frame, or a control frame.

According to the embodiment, multiple links can be a plurality of links (for example, Link1 to Link3 in FIG. 1) set up for communication between a station supporting multi-link communication and an access point supporting multi-link communication.

According to embodiment, the first link can be used to cause the corresponding station to wake up at listening interval to perform communication (such as listening for a beacon frame broadcasted by an access point), or the first link can be used to transmit a message frame indicating that the station is within the coverage range of the access point supporting multi-link communication (such as transmitting a Keep alive frame). Hereinafter, for ease of description, the first link can be referred to as a listening link or a transmitting link.

The information identification bit included in the first message frame can refer to the identification information of the station corresponding to the first link, that is, the station in a power-saving state can use the first link identified by the information identification bit to communicate with the access point. For example, the first message frame can include multi-link information elements (ML Elements), in which information related to the multiple links can be carried, and information identification bits can be utilized to indicate that one of the links (the first link) is used to listen for the beacon frame broadcasted by the access point or transmit a Keep alive frame (which can indicate that non-AP STA MLD is still within the coverage range of AP MLD).

For example, in the multi-link information element of the first message frame, multiple information identification bits corresponding to the multiple links can be added. When the information identification bit of one link (a first link) is set to a specific value (such as "1"), it indicates that the link (the first link) can be used to communicate with the access point in a power-saving state, such as listening for beacon frame broadcasted by the access point or transmitting a Keep alive frame. The Keep alive frame can be a PS Poll frames or other forms of action frames.

Although the information identification bit of one link (the first link) is described here, the present disclosure is not limited to this. For example, the first message frame may include more information identification bits to indicate that more links are used for stations in a power-saving state to listen or transmit Keep alive frames.

In the embodiment of the present disclosure, there are many ways to determine the first message frame, such as generating the first message frame based on at least one of the following conditions: network condition, load condition, hardware capabilities of transmitting/receiving devices, service type, and relevant protocol specification. There are no specific restrictions on this in the embodiment of the present disclosure. In the embodiment of the present disclosure, the first message frame can also be obtained from an external device, and there are no specific restrictions on this in the embodiment of the present disclosure.

More specifically, when determining the first message frame, the information identification bit corresponding to the first link can be determined, that is, which link among multiple links can be used for a station in a power-saving state to communication with the access point is determined. This will be described in detail later with reference to FIG. 3.

Continuing with reference to FIG. 2, in step 220, the first message frame can be transmitted. For example, the first message frame can be transmitted to the access point to inform the access point that the first link is used to perform communication in a power-saving state. The first message frame can be transmitted under any link in multiple links or under the first link, and there are no specific restrictions on this in the present disclosure.

By transmitting the first message frame carrying the information identification bit of the listening link or transmitting link (first link) to the access point, signaling interaction can be reduced, which is beneficial for energy conservation.

Figure 3:
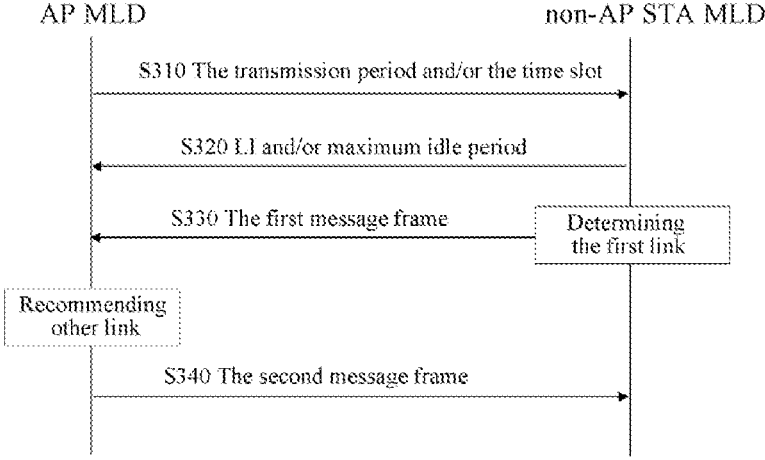
FIG. 3 is a flowchart illustrating interactive communica-tion according to an embodiment.

FIG. 3 is a flowchart illustrating interactive communication according to an embodiment.

Referring to FIG. 3, in step S310, a station supporting multi-link communication (non-AP STA MLD) can obtain (or receive) the transmission period and/or the time slot of beacon frame under each link of the access point supporting multi-link communication. In the case of obtaining the transmission period and/or time slot of beacon frame under each link of AP MLD, non-AP STA MLD can determine the first link based on the obtained transmission period and/or time slot, which will be described in detail later in step S330.

For example, in the process of multi-link setup (the process of association), non-AP STA MLD can receive a beacon frame or a probe response frame from the access point, where the received beacon frame or probe response frame can include the interval (BI, beacon interval) and/or time slot of AP broadcast beacon frame affiliated to each link of the same AP MLD. According to the embodiment, the interval (BI) of AP broadcast beacon frame under each link can represent the transmission period of the beacon frame under the corresponding link, and the time slot of AP broadcast beacon frame under each link can represent the transmission time of the beacon frame under the corresponding link. As an example, the time slots under each link can be identified by the reduced neighbor report element (RNRE) or the target beacon transmission time (TBTT) offset in the multi-link information element.

In step S320, during the process of multi-link setup (the process of association), the non-AP STA MLD can transmit a listen interval (LI) and/or maximum idle period to the AP MLD. For example, the listening interval and/or maximum idle period can be carried in probe request frames, association request frames, or re-association request frames. According to the embodiment, the maximum idle period transmitted by non-AP STA MLD can be less than or equal to the value of the maximum idle period defined by AP MLD in the maximum idle period element.

Through steps S310 and S320, non-AP STA MLD and AP MLD can negotiate the communication mode in a power-saving state during the process of multi-link setup (the process of association). According to the embodiment of the present disclosure, step S320 can be omitted, and step S320 can be merged with later step S330, that is, the first message frame transmitted in step S330 can carry the listening interval and/or maximum idle period.

In the process of association, the LI or maximum idle period of non-AP STA MLD can be at the MLD level, that is, stations affiliated to the same non-AP STA MLD have the same LI or maximum idle period. Stations affiliated to the same non-AP STA MLD will carry LI and/or maximum idle period under one link. The station will determine a link for listening to beacon frame or transmitting Keep alive frame based on the transmission period or time slot of beacon frames of different APs received in step S310, as well as its own LI or maximum idle period, that is, determine the first link.

The periods for the access point transmitting beacon frames under different links can be same or different, and the time slot for transmitting beacon frames varies under different links. When the non-AP STA MLD obtains the transmission period and/or time slot of beacon frame under each link in step S310, the transmission period or time slot of beacon frame under each link can be compared with its listening interval or idle period, to determine the listening link or transmitting link (first link). For example, the link with the minimum time in multiple links can be determined as the first link, where the minimum time represents one of following time:

minimum time between the listening interval and the transmitting period;
  minimum time between the listening interval and the time slot;
  minimum time between the idle period and the transmission period; or minimum time between the idle period and the time slot.

According to the embodiment, non-AP STA MLD can obtain (determine) the time to transmit beacon frame under each link based on the transmission period and/or time slot of beacon frame under each link obtained in step S310, and then compare the determined time under each link with the wake-up time (listening interval) or the time to transmit Keep alive frames (maximum idle period). If under one link, the wake-up time (listening interval) or the time to transmit Keep alive frames (maximum idle period) is the shortest from the time to transmit beacon frame, then the link can be determined as a listening link or a transmitting link. By referring to FIG. 1 for description, for example, the period of the broadcast beacon frame for AP1 under Link1 is BI1, and the time slot is TS1; the period of the broadcast beacon frame for AP2 under Link2 is BI2, and the time slot is TS2; the period of the broadcast beacon frame for AP3 under Link3 is BI3 and the time slot of TS3; the listening interval corresponding to STA1 to STA3 is LI, and the maximum idle cycle is MI. In one embodiment, when non-AP STA MLD obtains BI1, BI2, and BI3 in step S310, BI1, BI2, and BI3 can be compared with LI or MI, and the link corresponding to the minimum time in the comparison result can be determined as a listening link or a transmitting link (the first link). Alternatively, when non-AP STA MLD obtains TS1, TS2, and TS3 in step S310, TS1, TS2, and TS3 can be compared with LI or MI, and the link corresponding to the minimum time in the comparison results can be determined as a listening link or a transmitting link.

By determining the listening link or transmitting link (first link) based on the transmission period and/or time slot of beacon frame under each link, as well as its own listening interval or idle period, the corresponding station of non-AP STA MLD can wake up in time in a power-saving state to listen for beacon frame, or transmit Keep alive frame in time to avoid disconnection from the access point.

Although in the above embodiments, it is described to determine a listening or transmitting link (first link) based on the "minimum time" in the comparison results, the present disclosure is limited to this. For example, other suitable conditions can be selected based on the comparison results to determine listening link or transmitting link (first link).

When the non-AP STA MLD determines the first link, the information identification bit corresponding to the first link can be carried in the first message frame and the first message frame can be transmitted to the access point in step S330. The embodiment of information identification bits can be similar to the one described in step 210 of FIG. 2, where repeated descriptions are omitted to avoid redundancy.

In step 340, the non-AP STA MLD can receive a second message frame. According to the embodiment, the second message frame may include identification information of another link which is recommended by the access point and is different from the first link. In this case, non-AP STA MLD can determine another link recommended by the access point as the first link (listening link or transmitting link). That is, non-AP STA MLD can update the first link as the another link recommended by the access point. That is to say, after receiving the first message frame carrying the information identification bit of the first link in step 330, the access point can recommend another link as a listening link or transmitting link (the first link) based on the received information and other factors (such as its own load situation), and carry its identification information in the second message frame to transmit to non-AP STA MLD. By using another link recommended by the access point as the first link, the flexibility of the system can be increased and it is more advantageous to achieving power savings for the access point and station. However, the present disclosure is not limited to this. For example, step 340 may be omitted, in which case the access point may accept listening link or transmitting link determined by the station.

Figure 4:
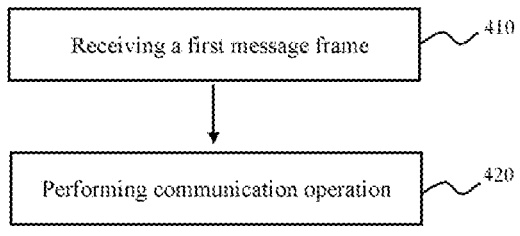
FIG. 4 is a flowchart illustrating another communication method according to an embodiment.

FIG. 4 is a flowchart illustrating another communication method according to an embodiment. The communication method shown in FIG. 4 can be applied to access points (AP MLD) supporting multi-link communication.

In step 410, a first message frame can be received, and the first message frame can include an information identification bit. The information identification bit can identify that a first link in multiple links is used for communication between a station in a power-saving state and an access point supporting multi-link communication. The embodiment of information identification bit can be similar to the one described in step 210 of FIG. 2, where repeated descriptions are omitted to avoid redundancy.

According to the embodiment, the first link can be used to cause the corresponding station to wake up at a listening interval to perform communication, or the first link can be used to transmit a message frame identifying that the station is within the coverage range of an access point supporting multi-link communication.

In step 420, communication operation can be performed based on the first message frame. For example, an access point can use a first link identified by the information identification bit of the first message frame to communicate with a station in a power-saving state. Alternatively, the access point can determine whether a first link is acceptable based on the information identification bit, and if not, recommend another link to the station.

It will be understood that the communication method shown in FIG. 4 is only exemplary and not a limitation of the present disclosure. For example, the communication method described in FIG. 4 may also include the communication operation performed by AP MLD in FIG. 3.

For example, the communication method described in FIG. 4 may also include transmitting information containing the transmission period and/or time slot of beacon frame of the access point under various links (S310). In this case, the first link is determined by the station based on the transmission period and/or time slot. For example, the first link is determined by the station based on the transmitting period or time slot as well as the listening interval or idle period. According to the embodiment, the first link is a link with the minimum time in multiple links, where the minimum time represents one of following time:

minimum time between the listening interval and the transmitting period;

minimum time between the listening interval and the time slot;

minimum time between the idle period and the transmission period; or minimum time between the idle period and the time slot. The embodiment for determining the first link can be referred to the detailed description in FIG. 3. For clarity, repeated descriptions are omitted here.

For example, the communication method described in FIG. 4 can also include recommending another link different from the first link as the first link (S340) based on information identification bits and load information of the access point. That is, another link different from the first link is recommended as an update of the first link based on the information identification bit and load information of the access point. According to the embodiment, AP MLD can determine a link for listening to beacon frame or transmitting Keep alive frames based on the load information of the access point. For example, if the corresponding AP has a high load under the first link determined by the non-AP STA MLD, then the AP MLD may not accept the first link and instead recommend another link based on the load situation, such as recommending a link with low load as the listening link or transmitting link. By recommending another link based on load information through the access point, communication congestion caused by uneven load at the access point can be avoided.

According to the embodiment of the present disclosure, the broadcast period (BI) of the beacon frame affiliated to each AP under each link in one AP MLD may be same or different, but their broadcast time slots are different. Non-AP STA MLD can obtain the broadcast period and/or time slot of AP under each link through beacon frame or detection response frame in the process of multi-link setup (the process of association).

According to the embodiment of the present disclosure, during the process of association, the LI or maximum idle period of non-AP STA MLD is at the MLD level, and stations affiliated to the same non-AP STA MLD will carry the LI and maximum idle period elements under one link. Furthermore, the station will determine a link to listen for beacon frame or transmit Keep alive frame based on the transmission periods and/or time slots of different AP beacon frames received above, as well as its own LI or maximum idle period information. Specifically, among multiple links, a link with the minimum time between LI or maximum idle period and transmission interval of beacon frame can be used as a listening link or a transmitting link for keep alive frame. For example, in the process of association (the process of multi-link setup), an information identification bit can be added to the multi-link information element to identify the link as a listening link/transmitting link.

According to the embodiment of the present disclosure, the AP can accept listening link/transmitting link determined by the station based on the received information (identification bit for listening link/transmitting link) and its own load reasons, or the AP can recommend another link. In other words, the listening link/transmitting link recommended by the access point can be same as or different from the listening link/transmitting link determined by the station.

The embodiments described above can be completed during the process of association (the process of multi-link setup). Alternatively, after the process of association (the process of multi-link setup) is completed, the station and access point can negotiate again.

Figure 5:
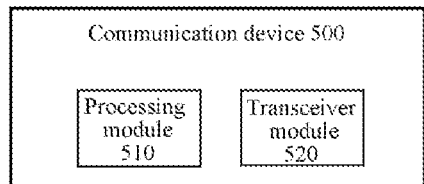
FIG. 5 is a block diagram illustrating a communication apparatus according to an embodiment.

FIG. 5 is a block diagram illustrating a communication device 500 according to an embodiment. Referring to FIG. 5, the communication device 500 may include a processing module 510 and a transceiver module 520.

The communication device 500 shown in FIG. 5 can be applied to stations supporting multi-link communication (non-AP STA MLD) or access points supporting multi-link communication (AP MLD).

In the case where the communication device 500 shown in FIG. 5 is applied to non-AP STA MLD, the processing module 510 can be configured to: determine a first message frame, the first message frame includes an information identification bit, where the information identification bit identifies that a first link in multiple links is used for communication between a station in a power-saving state and an access point supporting multi-link communication. The transceiver module 520 can be configured to transmit a first message frame. That is to say, the communication device 500 can perform the communication method described with reference to FIG. 2. In addition, it can also perform the operations performed by non-AP STA MLD in FIG. 3. For simplicity, repeated descriptions are omitted here.

In the case where the communication device 500 shown in FIG. 5 is applied to the AP MLD, the transceiver module 520 can be configured to receive a first message frame, and the first message frame includes an information identification bit. The information identification bit identifies that a first link in multiple links is used for communication between a station in a power-saving state and an access point supporting multi-link communication. The processing module 510 can be configured to control communication operations based on the first message frame. That is to say, the communication device 500 can perform the communication method described with reference to FIG. 4. In addition, it can perform the operations performed by the AP MLD in FIG. 3. For simplicity, repeated descriptions are omitted here.

In addition, the communication device 500 shown in FIG. 5 is only exemplary, and the embodiments of the present disclosure are not limited to this. For example, the communication device 500 may also include other modules, such as memory modules, etc. In addition, the various modules in the communication device 500 can be combined into more complex modules or divided into more individual modules.

The communication method and communication device according to the embodiments of the present disclosure can reduce the interaction of signaling, making devices in PS state more energy-efficient.

Based on the same principle as the method provided in the embodiment of the present disclosure, the embodiments of the present disclosure also provide an electronic device, which includes a processor and a memory. The memory stores machine-readable instructions (also known as "computer programs"). The processor is configured to execute machine-readable instructions to implement the methods described with reference to FIGS. 2 to 4.

The embodiments of the present disclosure also provide a non-transitory computer-readable storage medium on which a computer program is stored. When the computer program is executed by a processor, the methods described in FIGS. 2 to 4 are implemented.

In one or more embodiments, the processor can be used to implement or execute various exemplary logical blocks, modules, and circuits described in conjunction with the present disclosure, such as a CPU (Central Processing Unit), a general-purpose processor, a DSP (Digital Signal Processor), an ASIC (Application Specific Integrated Circuit), FPGA (Field Programmable Gate Array) or other programmable logic device, transistor logic device, hardware component, or any combination thereof. A processor can also be a combination of computing functions, such as a combination of one or more microprocessors, a combination of DSP and microprocessors, etc.

In one or more embodiments, the memory can be, for example, ROM (Read Only Memory), RAM (Random Access Memory), EEPROM (Electrically Erasable Programmable Read Only Memory), CD-ROM (Compact Disc Read Only Memory), or other optical disc storage, optical disk storage (including compressed optical discs, laser discs, optical discs, digital universal optical discs, Blu ray discs, etc.), disk storage media or other magnetic storage devices, or any other medium that can be used to carry or store program code in the form of instructions or data structures and can be accessed by a computer, but the memory is not limited to this.

It should be understood that although the steps in the flowchart in the accompany drawings are displayed sequentially according to the arrows, these steps are not necessarily executed in the order indicated by the arrows. Unless explicitly stated in this article, there is no strict order limit for the execution of these steps, which can be executed in other order. In addition, at least some of the steps in the flowchart of the accompany drawings may include multiple sub-steps or multiple stages, which may not necessarily be completed at the same time, but may be executed at different times. Their execution order may not necessarily be sequential, but these sub-steps or stages may be executed alternately with at least some of the other steps or sub-steps or stages of other steps.

Although certain embodiments of the present disclosure have been illustrated and described, those skilled in the art will understand that various changes in form and details may be made without departing from the scope of the present disclosure. Therefore, the scope of this disclosure should not be limited to embodiments, but should be limited by the accompanying claims and their equivalents.

What is claimed is:

1. A communication method under multiple links, performed by a station supporting multi-link communication, the communication method comprising:
　determining a first message frame, wherein the first message frame comprises an information identification bit, and the information identification bit identifies that a first link among the multiple links is used for communication between a station in a power-saving state and an access point supporting multi-link communication;
　transmitting the first message frame;
　obtaining at least one of a transmission period or a time slot of a beacon frame under at least one link of the access point supporting multi-link communication; and determining the first link based on at least one of the transmission period or the time slot.

2. The communication method according to claim 1, wherein determining the first link comprises:
　determining the first link based on a listening interval or an idle period of the station.

3. The communication method according to claim 2, wherein determining the first link comprises:
　determining a link with minimum time among the multiple links as the first link,
　wherein the minimum time represents one of following time:
　　minimum time between the listening interval and the transmission period;
　　minimum time between the listening interval and the time slot;
　　minimum time between the idle period and the transmission period; or
　　minimum time between the idle period and the time slot.

4. The communication method according to claim 1, wherein the first link is used to cause a corresponding station to wake up according to the listening interval to perform communication, or the first link is used to transmit a message frame identifying that the station is within a coverage range of the access point.

5. The communication method according to claim 1, further comprising:
　receiving a second message frame, wherein the second message frame comprises identification information of a second link which is recommended by the access point and is different from the first link;
　updating the first link as the second link.

6. A communication method under multiple links, performed by an access point supporting multi-link communication, the communication method comprising:
　receiving a first message frame, wherein the first message frame comprises an information identification bit, and the information identification bit identifies that a first link among the multiple links is used for communication between a station in a power-saving state and the access point supporting multi-link communication;
　performing a communication operation based on the first message frame; and
　transmitting information comprising at least one of a transmission period or a time slot of a beacon frame under at least one link of the access point,
　wherein the first link is determined by the station based on at least one of the transmission period or the time slot.

7. The communication method according to claim 6, wherein the first link is determined by the station based on a listening interval or an idle period of the station.

8. The communication method according to claim 7, wherein the first link is a link with minimum time among the multiple links,
　wherein the minimum time represents one of following time:
　　minimum time between the listening interval and the transmission period;
　　minimum time between the listening interval and the time slot;
　　minimum time between the idle period and the transmission period; or
　　minimum time between the idle period and the time slot.

9. The communication method according to claim 6, wherein the first link is used to cause a corresponding station to wake up according to the listening interval to perform communication, or the first link is used to transmit a message frame identifying that the station is within a coverage area of the access point supporting multi-link communication.

10. The communication method according to claim 6, further comprising:

recommending a second link different from the first link as an update of the first link based on the information identification bit and load information of the access point.

11. An electronic device comprising a memory, a processor, and a computer program stored on the memory and executable by the processor, wherein the processor performs following acts when executing the computer program:

determining a first message frame, wherein the first message frame comprises an information identification bit, and the information identification bit identifies that a first link among multiple links is used for communication between a station in a power-saving state and an access point supporting multi-link communication;

transmitting the first message frame;

obtaining at least one of a transmission period or a time slot of a beacon frame under at least one link of the access point supporting multi-link communication; and determining the first link based on at least one of the transmission period or the time slot.

12. The electronic device according to claim 11, wherein determining the first link comprises:

determining the first link based on a listening interval or an idle period of the station.

13. The electronic device according to claim 12, wherein determining the first link comprises:

determining a link with minimum time among the multiple links as the first link, wherein the minimum time represents one of following time:

minimum time between the listening interval and the transmission period;

minimum time between the listening interval and the time slot;

minimum time between the idle period and the transmission period; or minimum time between the idle period and the time slot.

14. The electronic device according to claim 11, wherein the first link is used to cause corresponding station to wake up according to the listening interval to perform communication, or the first link is used to transmit a message frame identifying that the station is within a coverage range of the access point.

15. The electronic device according to claim 11, wherein the processor further performs following acts when executing the computer program:

receiving a second message frame, wherein the second message frame comprises identification information of a second link which is recommended by the access point and is different from the first link;

updating the first link as the second link.

16. An electronic device comprising a memory, a processor, and a computer program stored on the memory and executable by the processor, wherein the processor performs the method of claim 6 when executing the computer program.

17. A non-transitory computer-readable storage medium, wherein a computer program is stored on the non-transitory computer-readable storage medium, and the computer program, when executed by a processor, implements the method according to claim 1.

18. A non-transitory computer-readable storage medium, wherein a computer program is stored on the non-transitory computer-readable storage medium, and the computer program, when executed by a processor, implements the method according to claim 6.

* * * * *